Dec. 20, 1966  E. WILDHABER  3,292,390

GEAR COUPLING

Filed April 1, 1965

INVENTOR:

Ernest Wildhaber 3,292,390
GEAR COUPLING
Ernest Wildhaber, Brighton, N.Y.
Filed Apr. 1, 1965, Ser. No. 444,736
7 Claims. (Cl. 64—9)

The present invention relates to gear couplings that permit varying angularity between the axes of the parts connected thereby.

In many instances couplings are specified for running under full load up to a given shaft angularity, and at little or no intended load at additional shaft angularities. The additional shaft angularities may be needed for assembly or for other purposes.

The invention relates to this type of couplings where additional shaft angularity is needed or is desirable.

Such couplings have hitherto been treated in one of two ways: They were either designed for the maximum shaft angularity regardless of load. Or they were designed for the shaft angularity under full load, and sufficient backlash was introduced so that they could be set to the maximum angularity without binding. The latter course usually meant edge contact at the very ends of the teeth at the maximum angularity. This is undesirable as it invites damage through some unintended load. And the first-named course is wasteful, as it calls for more crowning than necessary, whereby the load capacity is decreased.

The main object of the present invention is to avoid edge contact while providing a coupling of maximum capacity. The invention provides one kind of crowning for the specified load, and a much increased crowning for operation with little or no intended load.

Embodiments of the invention are illustrated in the drawings where:

Figure 1:
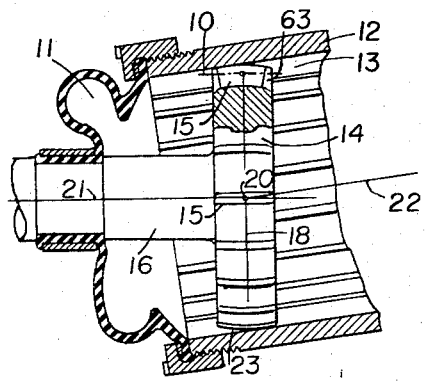
FIG. 1 is partly an axial section of a pair of intermeshing gear-coupling members, shown at shaft angularity and generally referred to as sleeve and hub, and partly a plan view thereof.
Figure 3:
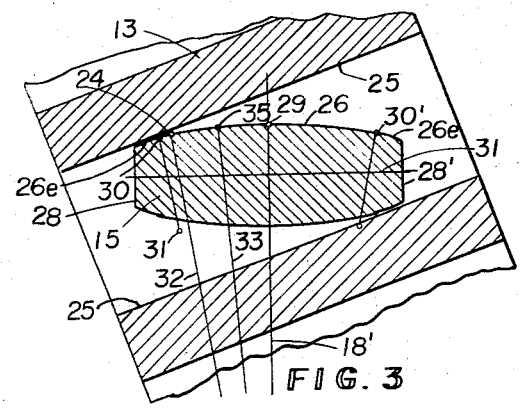

FIG. 3 is a fragmentary mean cylindrical section on an enlarged scale taken through the teeth of a hub coaxial therewith, and a cylindrical section of the same diameter taken through the sleeve coaxial therewith, the sections being developed into a plane and shown at exaggerated shaft angularity. The cylindrical surface with element 10, FIG. 1, provides such a mean cylindrical section through the hub teeth. FIG. 3 and subsequent figures are however at a larger scale.

Figure 4:
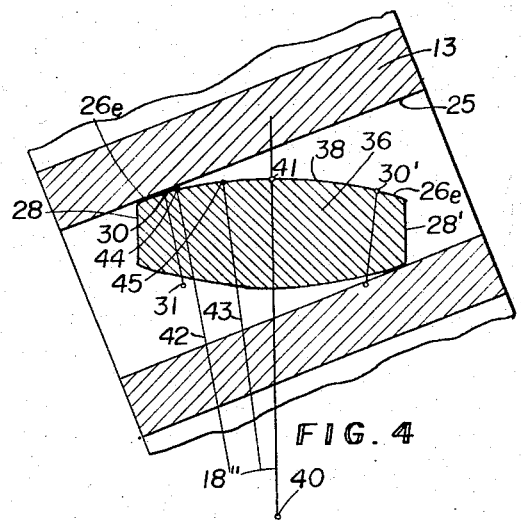
Figure 5:
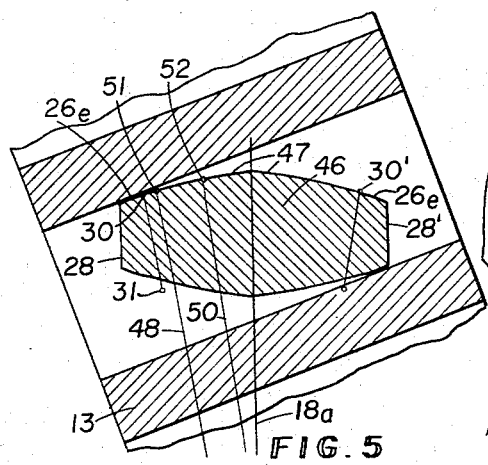

FIG. 4 and FIG. 5 are developed sections like FIG. 3, illustrating different crowning shapes in the tooth portions that are to carry the full load. FIG. 4 illustrates a shape where the crowning gradually decreases with increasing distance from the mid-plane, to the outmost portions designed to carry the full load. FIG. 5 illustrates a shape for a coupling intended to run at shaft angularities only and not in aligned position.

Figure 6:
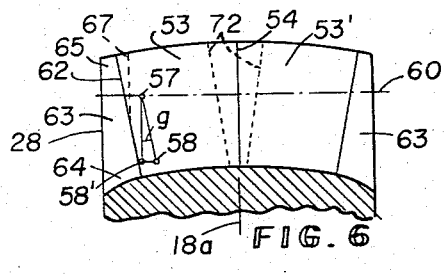

FIG. 6 is a fragmentary axial section taken through a hub corresponding to FIG. 5, and a front view of a tooth side.

Figures 7, 8:
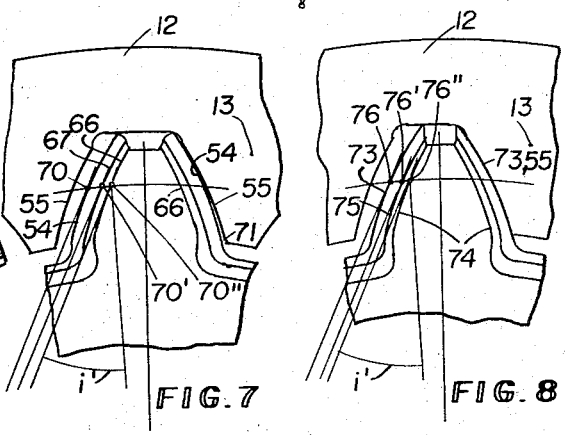

FIG. 7 is a fragmentary axial end view of a contacting hub and sleeve, with their axes set in alignment and corresponding to FIGS. 5 and 6.

FIG. 8 is a similar fragmentary axial end view corresponding to either FIG. 4 or to FIG. 3.

The gear coupling 11, FIG. 1, comprises a sleeve member or sleeve 12 with straight teeth 13 internally provided thereon, and an inner member or hub 14 having crowned teeth 15 projecting outwardly from a body portion and engaging said straight teeth. Hub 14 is rigid with a shaft 16. The seal 17 for retaining lubricant is not part of the claimed invention.

It should be understood that gear couplings are quite unusually arranged in pairs.

The hub teeth 15 are symmertrical with respect to a mid-plane 18, which also contains the intersection point 20 of the axes 21, 22 of the hub and sleeve. Teeth 15 extend along planes containing hub axis 21. The tooth tops lie in a spherical surface 23 of convex profile, centered at 20 in the mid-plane.

At zero shaft angularity contact between the crowned hub teeth and the straight sleeve teeth is centered in the mid-plane 18. The contact moves out towards the tooth ends increasingly with increasing shaft angularity. It may be centered at a point 24 (FIG. 3) on one side of the teeth at the largest shaft angularity under full load, in one of the two engagement zones. In the development to a plane of a mean cylindrical section coaxial with the sleeve the sectional profiles of the sleeve teeth 13 are straight lines 25, while the developed longitudinal profiles 26 of the hub teeth 15 are convex curves, in a cylindrical section coaxial with the hub and having the same radius as the first-named cylindrical section.

In accordance with the invention crowning is abruptly increased towards both tooth ends 28, 28', starting at a point 30 at a distance from point 24 about equal to half the width of the contact area centered at point 24. Adjacent the opposite end of the teeth increased crowning starts at a point 30'. Tooth 15 is symmetrical with respect to mid-plane 18' and also with respect to plane 31 which contains the hub axis. The symmetry also holds for the hub teeth (36, 46) shown in FIGS. 4 and 5).

The ends $26_e$ are curved much more than the working portion intermediate points 30, 30'. 31 is the curvature center at point 30 of the end curve $26_e$, and 30–31 is the curvature radius there. At the same point 30 the curvature radius of the working portion 30–30' is much larger, the curvature center lying approximately in the mid-plane 18' in this embodiment. This represents an abrupt change of the radius of curvature. The curvature is approximately constant all along the working portion 30–30', as is indicated by the normals 32, 33 at points 24, 35, where point 35 is midway between point 24 and point 29 of the mid-plane. It is seen that the angles included by adjacent normals 32, 33 and 33 and the normal lying in the mid-plane are approximately equal.

Profile end $26_e$ may be made a circular arc approximately.

FIG. 4 illustrates a hub tooth 36 that has the same profile ends $26_e$ as shown in FIG. 3, and the same curvature centers 31 of said ends. The working portion 38 between points 30, 30' however has a varying curvature. The curvature radius thereof is smallest in the mid-plane 18", the curvature center being at 40. The curvature radius gradually increases from point 41 to points 30, 30', as indicated by the direction of the normals 42, 43 at point 44 and intermediate point 45. Longitudinal profile 38 may be for instance a hyperbola, or a curve equidistant therefrom.

The increase in curvature radius at the regions that operate at increased shaft angularity increases the surface capacity of the tooth sides there, and tends to make up for the decreased number of teeth in contact and increased sliding.

FIG. 5 illustrates a gear coupling for running at shaft angularities only and not in aligned position. Here also each hub tooth 46 has the same profile ends $26_e$ as shown in FIGS. 3 and 4 and the same curvature centers 31 at said ends. The working portion 47 between points 30, 30' is here composed of two more or less convex branches that meet at an angle in the mid-plane 18a. 48, 50 are the normals at point 51 and intermediate point 52 respectively.

FIG. 6 is an axial section of the hub corresponding to FIG. 5 and a front view of a tooth side. The side surfaces 53, 53' or at least their extensions intersect in a ridge 54 in the mid-plane 18a. FIG. 7 affords an end view of the teeth, taken along the aligned axes of the sleeve and hub. Here and in the other embodiments the side profiles 55 of the straight sleeve teeth 13 are concavely curved. They may be for instance involutes.

The crowned tooth-side surfaces are best defined by the shape of the tooth sides of a rack that may mesh and roll with the hub and envelop the hub tooth-sides. These rack tooth-sides are described or enveloped by the generating tool, such as a cylindrical hob, as it is fed in a curved path across the face of the hub. The rack can be considered meshing with the hub, whereby a cylindrical pitch surface of the hub rolls without sliding on a pitch plane (60 in FIG. 6) of the rack.

The tooth surface normals of the rack are inclined to the direction of the rack motion which is perpendicular to the drawing planes of FIG. 1 and of FIG. 6. It can be demonstrated mathematically that all normals should have a constant inclination ($i$) thereto, when the sleeve has involute teeth. Due to the crowning the normals are also increasingly inclined to planes perpendicular to the hub axis with increasing distance from the mid-plane. FIG. 6 shows such a normal 57-58 at a point 57 in the pitch plane 60 of the rack. In projection it appears inclined to a plane perpendicular to the hub axis at an angle $g$.

If we assume point 57 in the drawing plane and point 58 of the normal at a unit distance from said plane, (distance=$l$), then projected distance 57-58 amounts to tan $i$, where $i$ is the aforesaid inclination angle.

Let us consider now the hub-tooth profile in a plane perpendicular to the hub axis, appearing as a vertical line (57-58') in FIG. 6, and the profile inclination to the radial direction at point 57. At this point and other points in pitch plane 60 the profile inclination is identical on the rack and on the hub. It is obtainable by projecting the surface normal to the sectional plane, whereby point 58 is projected to point 58'. Projected distance 57-58' represents tan $i'$, where $i'$ denotes the profile inclination in the plane perpendicular to the hub axis. Thus $$\tan i' = (\tan i) \cdot \cos g$$

$i'$ is always smaller than $i$. It decreases towards the ends of the teeth. This applies to the main working portions of the teeth and even more to the end portions of increased crowning. Here angle $g$ is larger and it increases at a more rapid rate.

The contact between the sleeve and the hub is centered along a surface normal in each of the two mesh regions. This normal is the theoretical path of contact. A hob also finish cuts along a surface normal in anyone feed position. And the increased-crown portions of the hub teeth should start along a line 62 that corresponds to a path of contact along a surface normal. At a point of pitch plane 60 its direction coincides with the inclined direction of the projected surface normal.

FIGS. 1 and 6 show the end portions 63 resulting from this requirement. They are at least fifty percent wider at the root 64 of the teeth than at the tooth top 65.

FIG. 7 shows the profile of ridge 54 shown in front view in FIG. 6, the profile 66 at the end plane 28 of the hub teeth, and the profile 67 at or immediately adjacent the spot of abrupt curvature change. All these profiles, and the profiles shown in FIG. 8, are in planes perpendicular to the hub axis.

We want to compare profile inclinations $i'$ to the radial direction at points 70, 70', 70'' of equal distance from the hub axis. To show up the profile inclination, tangents to the profiles are drawn at these points. The profile inclination decreases with decreasing distance of a tangent from the hub axis. Point 70'' has the smallest profile inclination. Even the ridge profile 54 is somewhat less inclined to the radial direction than the sleeve profile 55. At light load it touches the profile 55 adjacent the root of the sleeve teeth, without touching it at or near the inside end 71 of the sleeve teeth.

To match the profiles in the central plane, if it were so desired, a tapered connecting surface would be required between the sides 53, 53', bounded for instance by the dotted inclined lines 72 (FIG. 6).

FIG. 8 corresponds to the showing of FIG. 4 or also of FIG. 3. It shows profile 73 in the mid-plane, profile 74 at the outside end 28, and profile 75 at or immediately adjacent the start of abrupt curvature change. Profile tangents are drawn at points 76, 76', 76'' of equal distance from the hub axis. Profile 73 matches the sleeve-tooth profile 55, while profiles 74, 75 have decreased profile inclinations $i'$, smallest on profile 74.

The portions 63 of increased crowning may be mechanically produced in the same operation as the main working sides of the teeth, by modifying the rate of depthwise feed. Conventionally the feed of a tool, such as a hob, relatively to the hub member is a uniform feed along the hub axis, and an additional varying feed at right angles thereto in the depthwise direction of the teeth, to obtain a resultant feed in a curved path. The said additional feed is usually controlled with a templet and abutment.

Figure 2:
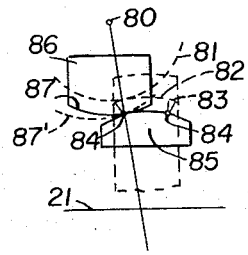
FIG. 2 is a diagram explanatory of the crowning process.

A hob with center 80 (FIG. 2) and outline 81 may be fed along a root surface 82 that has arcuate ends 83 centered at 84. To crown in moderate production, I may use a templet 85 whose profile passes through centers 84. At these centers the templet profile is cut off at an obtuse angle, an operation easy to perform accurately. The templet is in contact with an abutment 86 that has a circular arcuate face 87 centered at 80. Its radius is increased over the hob radius by the radius of the arcuate ends 83. As the hob is fed beyond the start of the arcuate ends the abutment rides over the blunt edge of the templet and effects circular feed of the hob center about center 84. 87' shows such as position of the arcuate face of the abutment.

For large production I may make a templet with composite curves.

The invention is not confined to involute teeth but is broadly applicable. For definition of its scope reliance is placed on the appended claims.

I claim:
1. A gear coupling comprising a sleeve with straight teeth internally provided thereon and a hub having crowned teeth projecting outwardly from a body portion and engaging said straight teeth, the intersection lines of said crowned teeth with a mean cylindrical surface coaxial with the hub being convexly curved and having an abruptly changing radius of curvature adjacent both ends of the teeth, in the development of said cylindrical surface to a plane, said radius being less than half the minimum radius of curvature of the portion intermediate said abrupt changes.

2. A gear coupling comprising a sleeve with straight teeth internally provided thereon and a hub having crowned teeth projecting outwardly from a body portion and engaging said straight teeth, the intersection lines of said crowned teeth with a mean cylindrical surface coaxial with said hub being convexly curved and having an abruptly changing radius of curvature adjacent both ends of the teeth, in the development of said cylindrical surface to a plane, for increasing crowning adjacent said ends, the side profiles of said crowned teeth in planes perpendicular to the hub axis having a changing profile inclination to the radial direction in said end portions of increased crowning, at points of equal distance from the hub axis, said inclination decreasing towards the ends of the teeth.

3. A hub member having crowned teeth spaced in a circle about an axis and extending along planes containing said axis, the side surfaces of said teeth having opposite end portions of abruptly increased crowning, said portions being wider adjacent the root of the teeth than at the tooth tops, and the outside ends of said teeth lying in a surface of revolution of convex profile.

4. A hub member according to claim 3, wherein the end portions of abruptly increased crowning are at least fifty percent wider at the root of the teeth than at their top.

5. A hub member having crowned teeth spaced in a circle about an axis and extending along planes containing said axis, the outside ends of said teeth lying in a surface of revolution of convex profile, the side surfaces of said teeth being most crowned adjacent the tooth ends and being of varying survature radius between said most crowned portions and being least crowned at the portions immediately adjacent said most crowned portions, said side surfaces extending from end to end along continuous lines without abrupt change of direction.

6. A gear coupling according to claim 1, wherein the intersection lines of the crowned tooth sides with said mean cylindrical surface have a gradually changing curvature between the points of abrupt curvature change, the curvature radius adjacent said points being at least fifty percent larger than at the mid-plane of the hub.

7. A gear coupling for running at shaft angularities only and not in aligned position, comprising a sleeve with straight teeth internally provided thereon and a hub having teeth projecting outwardly from a body portion and engaging said straight teeth, the intersection lines of the hub teeth with a mean cylindrical surface coaxial with the hub having an abruptly decreased radius of curvature adjacent both ends of the teeth, said teeth having side surfaces that intersect at least with their extensions in a ridge at the mid-plane of the hub, said ridge being less inclined to the radial direction than the tooth profile of the sleeve, so that it touches the profile of the sleeve teeth adjacent the root of the sleeve teeth when sleeve and hub contact in aligned position at light load, without touching it at the inside end of the sleeve-tooth profile.

References Cited by the Examiner

UNITED STATES PATENTS

| | | | |
|---|---|---|---|
| 885,194 | 4/1908 | Sponable | 74—462 |
| 2,682,760 | 7/1954 | Shenk | 64—9 |
| 2,918,809 | 2/1959 | Miller | 64—9 |
| 2,922,294 | 1/1960 | Wildhaber | 64—9 |

FRED C. MATTERN, Jr., *Primary Examiner.*

HALL C. COE, *Examiner.*